United States Patent [19]

Khosropour

[11] Patent Number: 4,707,166
[45] Date of Patent: Nov. 17, 1987

[54] AIR DRYER FOR AIR BRAKE SYSTEM

[75] Inventor: Mostafa M. Khosropour, Madison, Wis.

[73] Assignee: Nelson Industries, Inc., Stoughton, Wis.

[21] Appl. No.: 902,196

[22] Filed: Aug. 29, 1986

[51] Int. Cl.⁴ .............................................. B01D 39/10
[52] U.S. Cl. ......................................... 55/213; 55/21; 55/218; 55/315; 55/342; 55/467; 55/DIG. 17
[58] Field of Search ..................... 55/DIG. 17, 21, 30, 55/213, 218, 274, 315, 316, 342, 497, 518, 521; 62/11, 37

[56] References Cited

U.S. PATENT DOCUMENTS

| | | |
|---|---|---|
| 3,152,877 | 10/1964 | Kaufman ................................. 55/30 |
| 3,464,186 | 9/1969 | Hankison et al. ....................... 55/163 |
| 3,472,000 | 10/1969 | Glass et al. ............................. 55/163 |
| 3,516,231 | 6/1970 | George ................................... 55/267 |
| 3,841,064 | 10/1974 | Hitchiner et al. ...................... 55/269 |
| 3,934,990 | 1/1976 | Idle, III ................................. 55/218 |
| 4,029,486 | 6/1977 | Frantz .................................... 55/218 |
| 4,052,178 | 10/1977 | Frantz .................................... 55/212 |
| 4,097,248 | 6/1978 | Frantz .................................... 55/32 |
| 4,131,442 | 12/1978 | Frantz .................................... 55/387 |
| 4,177,049 | 12/1979 | Haslett ..................... 55/DIG. 17 X |
| 4,199,331 | 4/1980 | Frantz .................................... 55/161 |
| 4,242,111 | 12/1980 | Arends et al. ............ 55/DIG. 17 X |
| 4,261,715 | 4/1981 | Frantz .................................... 55/387 |
| 4,336,042 | 6/1982 | Frantz et al. ........................... 55/387 |
| 4,409,005 | 10/1983 | McKendrick ............ 55/DIG. 17 X |
| 4,487,617 | 12/1984 | Dianes et al. .......................... 55/163 |
| 4,519,819 | 5/1985 | Frantz ............................... 55/218 X |
| 4,572,725 | 2/1986 | Kojima ................................... 55/274 |

OTHER PUBLICATIONS

Chemical Engineering Progress, vol. 62, No. 4, Apr. 1966, pp. 60-65.
"Hayden Takes The Heat Off Allison", Hayden, Inc.
"Dunham-Bush—The Oil Cooling Experts", Copyright Dunham-Bush, Inc., 1978.
"Stark Expello Valves Instructions For Installation & Service", Stark Manufacturing, Incorporated, 24611 Crestview Ct., Framington Hills, MI 48018.

Primary Examiner—Charles Hart
Attorney, Agent, or Firm—Andrus, Sceales, Starke & Sawall

[57] ABSTRACT

An air dryer (2) for an air brake system of a truck or the like includes separate heat exchanger and filtering housing sections (16 and 18) mounted side-by-side in a compact integral housing unit (10). The heat exchanger cools the air to condense water therefrom, and a water repellant downstream filter (42) permits air flow therethrough but blocks the passage of water. A pressure responsive valve (82) communicates with the outlet of the heat exchanger and the inlet of the filter for discharging water condensed from the heat exchanger and repelled by the filter.

12 Claims, 11 Drawing Figures

AIR DRYER FOR AIR BRAKE SYSTEM

BACKGROUND AND SUMMARY

The invention relates to air dryers for air brake systems used on trucks and the like, and more particularly to improvements providing a substantially increased life rating and a substantial reduction in size and weight.

In air brake systems for trucks, air is typically supplied from an air compressor at the intake side of the truck engine. The air is supplied to an air dryer and then to an air tank and then to the air brakes. The air dryer is needed to remove water from the air brake lines and hence prevent problems of brake line freeze in winter, as well as other damage caused by water in the lines.

Air dryers typically use desiccant to absorb the water. While desiccant works well initially, it loses its absorption capability with time and becomes less effective. Furthermore, there is some oil in the air from the compressor, and the desiccant becomes coated with oil and further loses its absorption capability.

The housing for the desiccant is large and heavy because the larger the size the more desiccant can be accommodated. A disadvantage of this large size is that the air compressor must first fill the air dryer housing before it fills the air tank, and hence the larger the air dryer housing size the longer time it takes to fill or refill the air tank, which may be unacceptable for certain brake systems. A further disadvantage of the large size is that it limits the number of places on the truck where the air dryer can be mounted. A given truck may have adequate room at a certain place, while another truck may only have adequate room at another place, thus requiring different mounting locations, hardware arrangements, etc. for different trucks. This individual custom mounting is not cost effective. Furthermore, the large size adds considerable weight, a typical weight being about 34–39 pounds.

The present invention provides significant improvements in size and weight reduction, the preferred embodiment weighing about seven pounds. The size reduction enables the air dryer and hence the air tank to quickly fill or refill. Furthermore, the size reduction enables a universal mounting location and arrangement for numerous trucs, reducing installation time and expense.

The invention further eliminates the need to use desiccant, and provides substantially exterded life. Separate heat exchange and filter sections are provided and in the preferred embodiment connected together in an integral housirg. The heat exchanger cools the air from the compressor from 300–400° F. to within a few degrees of ambient temperature, condensing and separating water from the air. The air then travels to a downstream water repellant filter permitting air flow therethrough but blocking water to separate drops of water from the air which have not dropped off previously and separating oil and other solids from the air. A pressure responsive valve communicates with the outlet of the heat exchanger and the inlet of the filter and discharges water condensed from the heat exchanger and repelled by the filter each time the compressor cycles at the lower and upper limits of its operating range at cut-in and cut-out. The air dryer operates for hundreds of hours between filter changes. The air dryer construction permits ready access and filter removal, for reduced maintenance expense.

BRIEF DESCRIPTION FO THE DRAWINGS

DETAILED DESCRIPTION

Figures 1, 2:
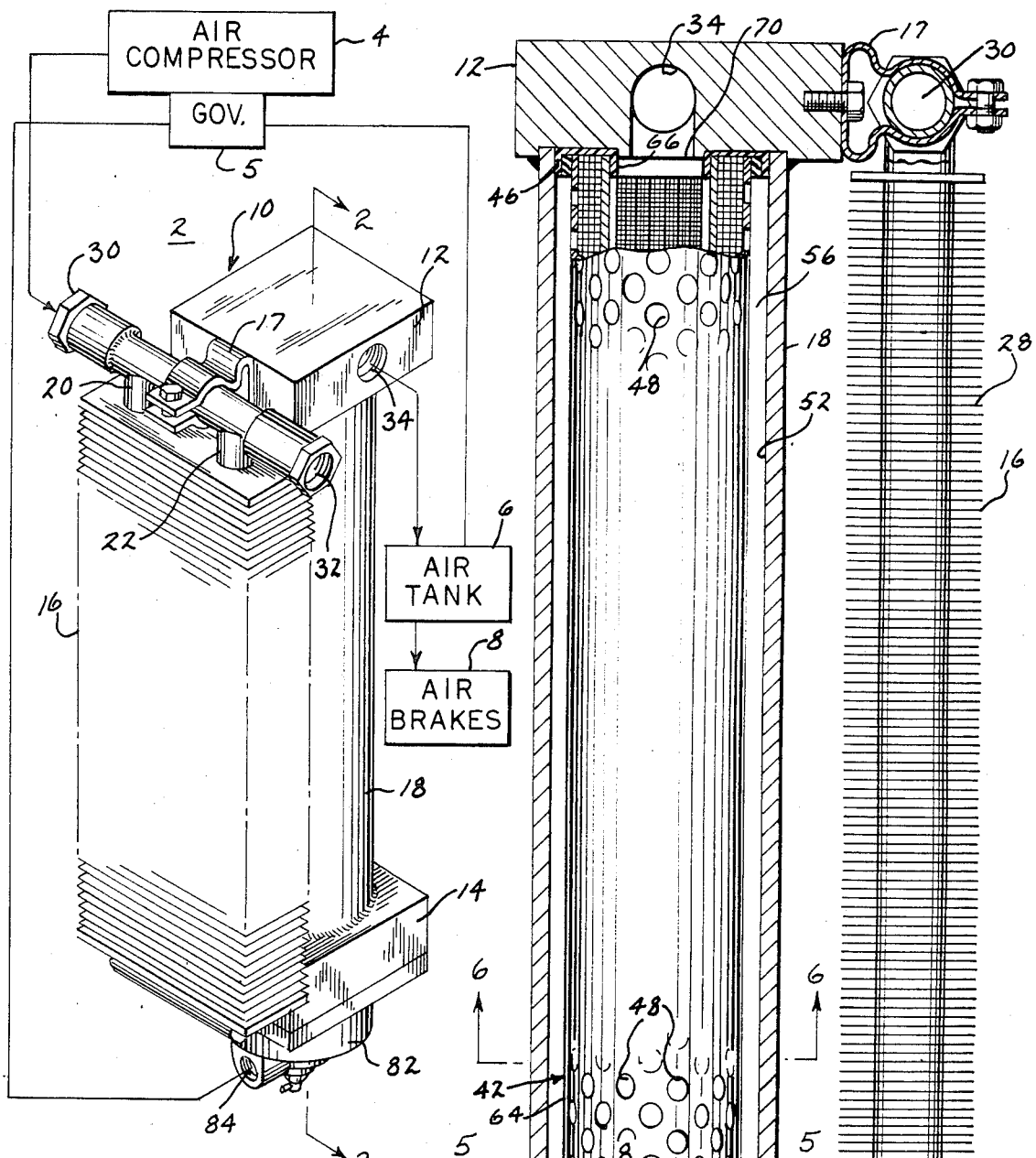
FIG. 1 is a perspective view of an air dryer constructed in accordance with the invention.
FIG. 2 is a sectional view taken along line 2—2 of FIG. 1.
Figure 3:
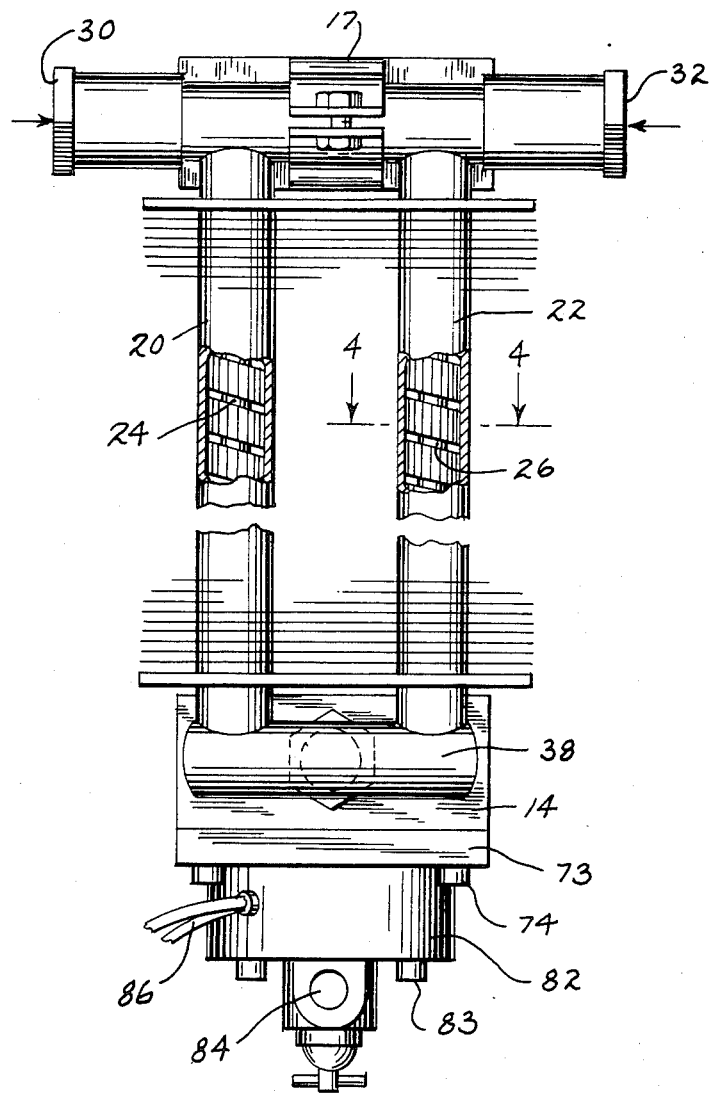
FIG. 3 is a side elevation view of the structure in FIG. 2.
Figure 4:
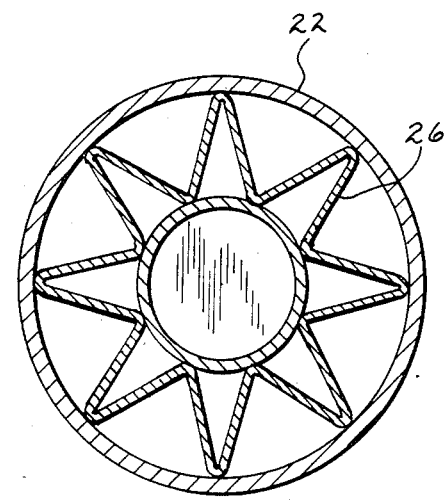
FIG. 4 is a sectional view taken along line 4—4 of FIG. 3.

FIG. 1 shows an air dryer 2 for a truck or the like having an air brake system including an air compressor 4 supplying air to an air tank 6 and in turn to air brakes 8. Air dryer 2 dries the air supplied by compressor 4 to tank 6. The air dryer has a compact construction includinq an inteqral housinq unit 10 havinq distally opposite ends 12 and 14 with first and second parallel housing porticns 16 and 18 extending longitudinally therebetween. First housing portion 16 has one or more members 20 and 22 having internal turbulated passages 24 and 26 FIG. 3, and external heat radiating fins 28 to provide a heat exchanger for cooling air in first housing portion 16 to condense water therefrom. The turbulated passages have a star shaped cross section, FIG. 4. This type of heat exchanger is known in the art, for example a Hayden Inner-Swirl heat extractor, ard a Dunham-Bush Kool-Mor heat exchanger. Another heat exchanger which may be used is a Modine automotive tpye heat exchanger or radiator with rectangular passages. Other types of heat exchangers may also be used, with various shape passages. The top of the heat exchanqer is secured by bracket 17 to the top end 12 cf the housing unit and has a pair of openings 30 and 32. Opening 30 receives air from compressor 4. Opening 32 is for installation of a safety relief valve (not shown). The bottom of the heat exchanger is secured by threaded fitting 19 to the bottom end 14 of the housing unit and communicates with the interior thereof, to be described.

Figure 5:
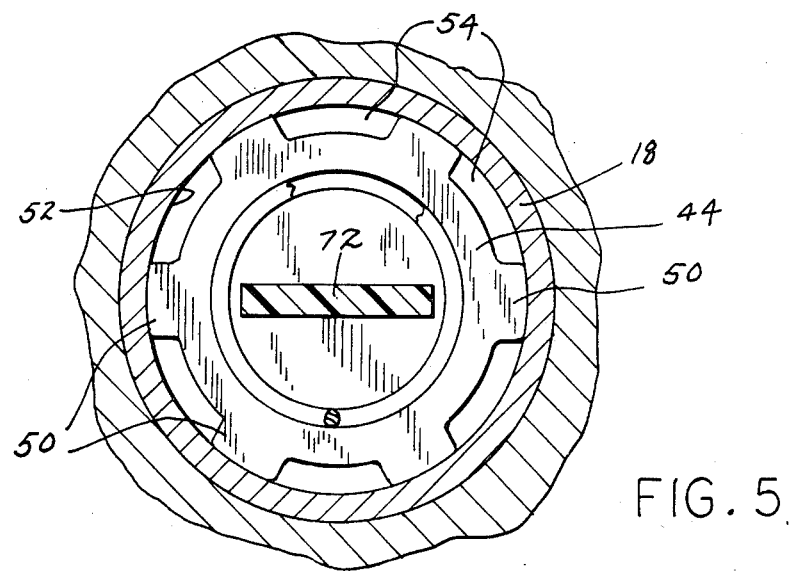
FIG. 5 is a sectional view taken along line 5—5 of FIG. 2.

The second housing portion 18 is a hollow metal cylinder extending axially longitudinally between and welded or glued to metal housing unit ends 12 and 14 adjacent and parallel to the heat exchanger housing portion 16, and has an outlet 34 to air tank 6. Alternatively, portion 18 and ends 12 and 14 may be a one piece plastic member. A communication passage 36, FIG. 2, communicates between tne first and second housing portions 16 and 18 and provides an outlet 38 from first housing oortion 16 and an inlet 40 to second housing portion 18. A water repellant filter 42 is in the second housing portion 18 downstream of heat exchanger 18 and passes air from inlet 40 through filter 42 to outlet 34 and blocks passage of water therethrough. Filter 42 is a hollow cylindrical member extending axially longitudina.ly within housing portion 18. Filter 42 has axially distally opposite end caps 44 and 46 and a filtering medium 48 extending axially therebetween. The end caps have a plurality of radial projections 50, FIG. 5, engaging the inner surface 52 of hollow cylindrical housing portion 18 and defining a plurality of arcuate gaps 54 space between radial projections 50. Arcuate gaps 54 space filtering medium 48 radially inwardly from inner surface 52 of cylindrical housing 18 to define an annular gap 56( therebetween, FIG. 2.

Figure 6:
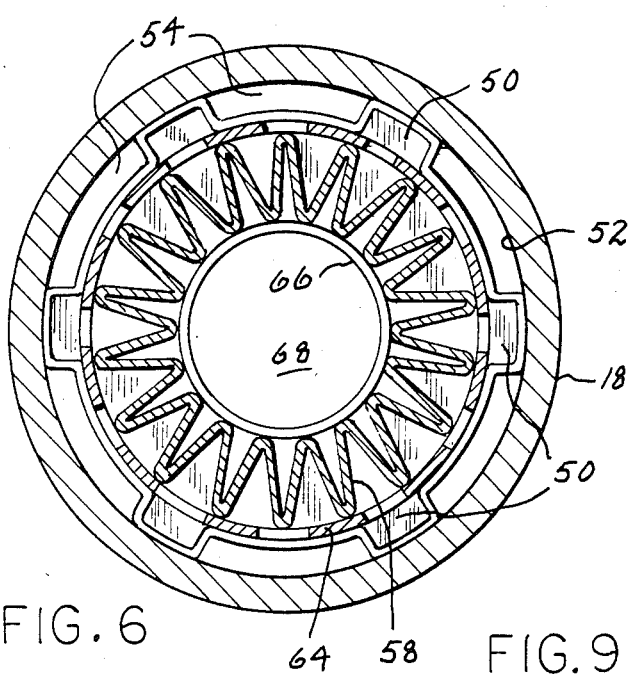
FIG. 6 is a sectional view taken along line 6—6 of FIG. 2.
Figure 7:
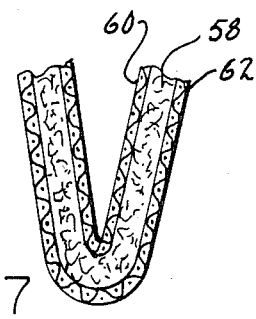
FIG. 7 is an enlarged view of a portion of FIG. 6.

Filtering medium 48 is a pleated felt member 58, FIG. 6, sandwiched between pleated inner and outer screens or wire meshes 60 and 62, FIG. 7, and surrounded by an outer annular perforated shell 64 mounted at its axial ends to <nd caps 44 and 46. Upper end cap 46 is an annular plastic member with a central aperture 66 therethrough communicating with the hollow interior 68 of filtering medium 48 and with outlet 34 through a passage 70 in housing end 12. Lower end cap 44 is a solid plastic disc-like member blocking the bottom of the hollow interior 68 of the filtering medium and having an integral molded handle 72 extending downwardly therefrom.

Dryer 2 is a vertical unit mounted to a truck or the like in a vertical position such that first and second housing portions 16 an<18 extend generally vertically. The inlet 40 to filtering housing section 18 is at the bottom end 14 of the housing unit, and the outlet 34 from the filtering housing is at the top end 12 of the housing unit. The lower end 14 of the housing unit has a removable plate 73 attached thereto by bolts 74 and sealed by annular gasket or O-ring 75, and axially spaced below lower end cap 44 to define an axial gap 76 therebetween providing a collection chamber. Biasing means is provided in axial gap 76 and is provided by a compression spring 78 extending axially vertically therein and bearing at its bottom end against plate 73 and at its top end against end cap 44 to bias filter 42 upwardly toward housing end 12 and seal upper end cap 46 against upper housing end 12. Passage 70 communicates with hollow interior 68 of filter 42, and the upper axial end of the filter at annular end face cap 46 encir<les passage 70. The hollow interior 68 of the filter thus communicates with outlet 34. The exterior of the filtering medium 48 communicates through annular gap 56 and arcuate spaces 54 with axial gap collection chamber 76 and inlet 40 and passage 36 and outlet 38 cf heat exchanger 16. Air from compressor 4 thus flows into inlet 30, then through turbulated passages 21 and 22, then through outlet 38, then through communication passage 36, then through inlet 40, then through collection chamber 76, then through arcuate passages 54 adjacent bottom cap 44, then axially upwardly thrcugh annular gap 56, then through outer annular perforated shell 64, then radially inwardly through filtering medium 48, then axially upwardly through hollcw interior 68 of the filter, then through passage 70 to outlet 34, for supplying dry air to tank 6. Collection chamber 76 collects water condensed from heat exchanger housing portion 16 and collects water repelled by filter 42.

Figure 11:
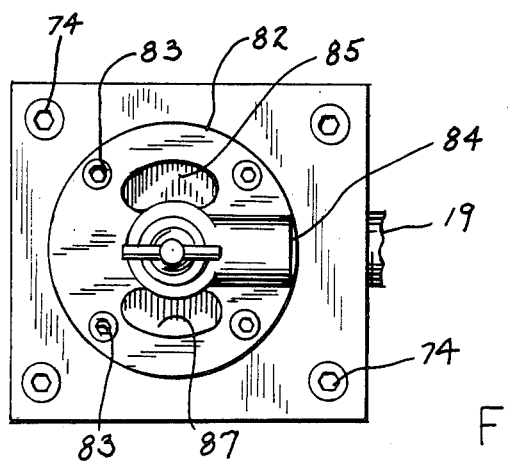
FIG. 11 is a bottom view of a portion of the structure in FIG. 2.

A pressure responsive valve 82 is mounted to plate 73 by bolts 83 and communicates with the outlet of the heat exchanger and the inlet of the filter, and opens in response to a given air pressure to discharge water condensed from heat exchanger 16 and repelled by filter 42. Valve 82 is known in the art and in the preferred embodiment is a Stark model 15000, Stark Installation and Service Manual 1218510M, Form S-103, Stark Manufacturing Incorporated, 24611 Crestview Ct., Farmington Hills, Mich. 48018. Other types of pressure responsive valves may of course be used. Valve 82 has an open condition externally discharging water from the heat exchanger and filter, and has a closed condition blocking such discharge. Water is discharged at lower crescent shaped openings 85 and 87, FIG. 11. Governor 5 of air compressor 4 senses air pressure in tank 6 and turns on the air compressor in response to a given cutin pressure, such as 100 psi, pounds per square inch. The governor is also connected to valve 82 at control port 84 to actuate the latter When actuated, valve 82 changes from the closed condition momentarily to an open condition and then back to the closed condition. Governor 5 also responds to a given cut-out pressure, such as 120 psi in air tank 6 to turn off compressor 4 and to again actuate valve 82 to change from the closed condition momentarily to the open condition and then back to the closed condition. The 100–120 psi is the typical pressure range in which a truck air brake system is operated and air compressor 4 cuts in and cuts out, respectively. Water is purged from the heat exchanger and the filter when air pressure falls below such range and the compressor cuts in, and water is purged from the heat exchanger and the filter when air pressure rises above such range and the air compressor cuts out. Valve 82 includes a thermostatically controlled internal heater with an electrical connection at 86, which heater prevents freezing of the water in cold weather.

Figure 8:
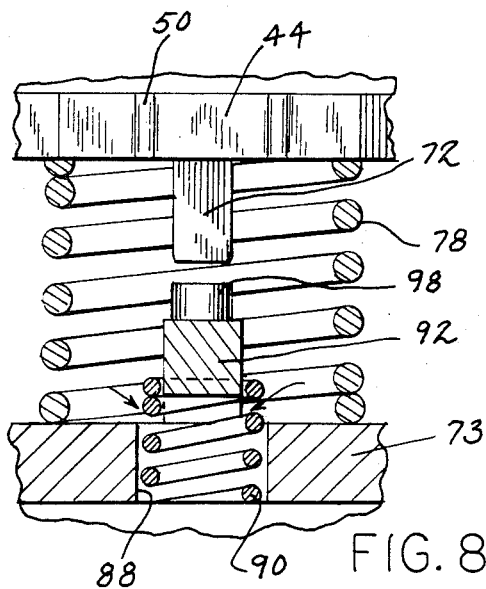
FIG. 8 is a sectional view taken along line 8—8 of FIG. 2.

Pressure responsive valve 82 axially communicates with collection chamber 76 through an aperture 88 in plate 73, and opens in response to the noted air pressures to discharge water collected in chamber 76 through aperture 88 and discharge outlets 85, 87. Valve 82 has a compression spring 90 associated there with which is normally biased downwardly by an upper cover assembly. In the construction in FIG. 2, the cover assembly is eliminated, and spring 90 bears at its upper end against a bridging yoke member 92 mounted to plate 73 and extending across aperture 88 and cooperating with valve spring 90 in aperture 88. Filter end cap handle 72 is axially spaced above bridging yoke member 92. Compression spring 78 encircles handle 72 and bridging yoke member 92 and is concentric to valve spring 90. Bridging yoke member 92 has a length greater than the diameter of aperture 88, and has a width, FIG. 8, less than such diameter, such that water from collection chamber 76 is discharged through aperture 88 and valve 82 along the sides of bridging yoke member 92. Bridging yoke member 92 has distal ends 94 and 96 on opposite sites of aperture 88 and mounted to plate 72 by bolts 98 and 100. A pair of grooves 102 and 104 are inwardly adjacent respective ends 94 and 96 and generally with the edges of aperture 88 and have a boss 106 therebetween. The upper end of spring 90 is disposed in groves 102 and 104 and encircles boss 106 which extends axially downwardly within the spring.

Figure 9:
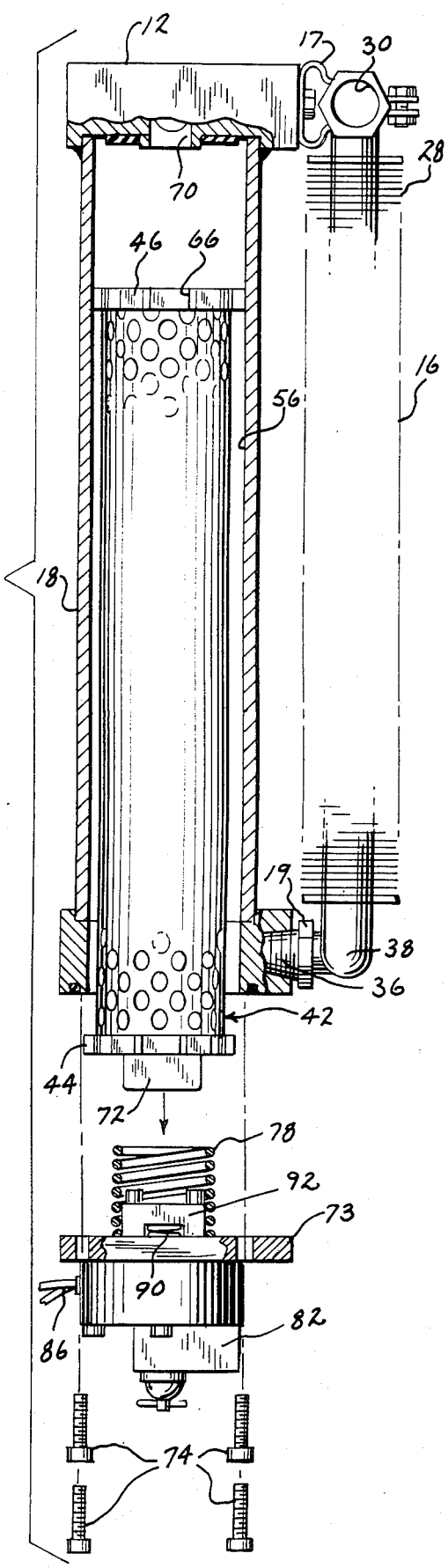
FIG. 9 is a view like FIG. 2 but showing partial disassembly.

Filter 42 is readily changed by removing plate 73, FIG. 9, gripping haudle 72 and extracting the filter axially downwardly from housing portion 18.

Figure 10:
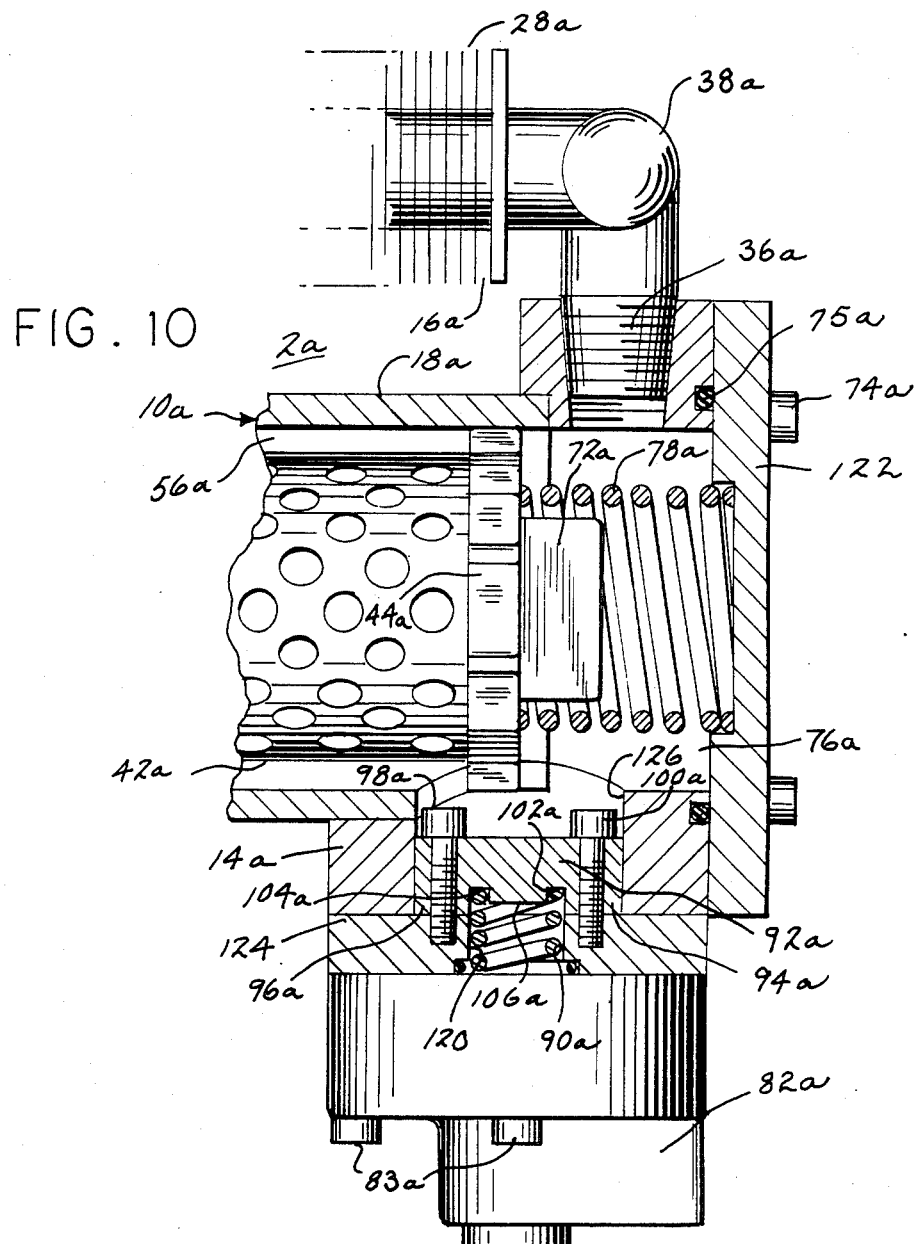
FIG. 10 is a sectional view showing an alternate embodiment of a portion of the structure in FIG. 2.

FIG. 10 shows a horlzontal unit for mounting to a truck or the like in a horizontal position such that housing portions 16 and 18 extend generally horizontally. FIG. 10 uses like reference numerals as the prior figures, with the postscript "a" here appropriate to facilitate clarity. Valve 82a extends downwardly from the bottom of housing portion 18 adjacent the latter's right end, and communicates radially with collection chamber 76a through a radial aperture 120 in right end 14a of housing unit 10a. Compression spring 78a extends axially in collection chamber 76a, as in FIG. 2, and between bears between filter end cap 44 and a removable axial and plate 122 mounted to housing end 14a by bolts 74a and sealed by O-ring 75a. Valve spring 90a extends in aperture 120 and is perpendicular to spring 78a. Aperture 120 is provided through another plate 124 mounted with valve 82a to the side of end 14a by bolts 83a. Bridging yoke member 92a is mounted to plate 124 within collection chamber 76a by bolts 98a and 100a and extends across aperture 120 and cooperates with valve spring 120 in the aperture. Bridging yoke member 92a is disposed in opening 126 in the side of end 14a. Bridging yoke member 92a has a length greater than the diameter of aperture 120, and has a width less than such di;meter, such that water from collection chamber 76a is discharged through aperture 120 and valve 82a along the sides of bridging member 92a. Bridging yoke member 92a has distal ends 94a and 96a on opposite sides of aperture 120 and mounted to plate 124 by bolts 98a and 100a. A pair of grooves 102a and 104a are inwardly adjacent respective ends 94a and 96a and generally aligned with the edges of aperture 120 and have a central boss 106a therebetween. The upper end of spring 120 is disposed in grooves 102a and 104a and encircles boss 106 which extends downwardly within the spring.

It is recognized that various equivalents, alternatives and modifications are possible within the scope of the appended claims.

I claim:

1. A compact air dryer construction for an air brake system, comprising:
   a housing unit having distally opposite ends and having a first housing portion extending between said ends, said first housing portion comprising one or more members having internal passage means and external heat radiating fins to provide a heat exchanger for cooling air in said first housing portion to condense water therefrom, and having a second hollow cylindrical housing portion extending axially longitudinally between said ends;
   an air inlet to said first housing portion;
   an air oulet from said second housing portion;
   a communication passage communicating between said first and second housing portions and providing an outlet from said first housing portion and an inlet to said second housing portion;
   a water repellant filter in said second housing portion and having a first side communicating with said communication passage and having a second side communicating with said outlet from said second housing portion, said filter passing air therethrough and blocking the passage of water therethrough,
   wherein said inlet to said second housing portion is at one of said distal ends of said housing unit, said outlet from said second housing portion is at the other of said distal ends of said housing unit, said filter is a hollow tubular member spaced radially inwardly of said hollow cylindrical second housing portion to define an annular gap therebetween communicating with one of said inlet and outlet for said second housing portion, the hollow interior of said tubular filter element communicating with the other of said inlet and outlet for said second housing portion, such that air flows axially in said annular gap and in said hollow interior of said tubular filter and flows radially through said filter between said inlet and outlet of said second housing portion, wherein said one distal end of said housing unit comprises a plate axially spaced from one end of said filter to define an axial gap therebetween, said annular gap communicates through said axial gap with said inlet to said second housing portion, and comprising biasing means in said axial gap bearing between said plate and said one end of said filter to bias the latter toward said other distal end of said housing unit, said outlet from said second housing portion has a passage communicating with the hollow interior of said tubular filter, the other axial end of said filter has an annular end face encircling said last mentioned passage and biased into sealing engagement with said other distal end of said housing unit by said biasing means, and wherein said axial gap defines a collection chamber in said second housing portion a said one distal end of said housing unit for collecting water condensed from said first housing portion and repelled by said filter in said second housing portion.

2. The invention according to claim 1 comprising a pressure responsive valve axially communicating with said collection chamber through an aperture in said plate, said valve opening in response to a given air pressure to discharge water collected in said collection chamber, and wherein said housing unit is mounted to a truck or the like in a vertical position such that said first and second housing portions extend generally vertically, with said valve extending downwardly from said plate at the bottom of said second housing portion.

3. The invention according to claim 2 wherein said biasing means comprises a compression spring extending axially in said collection chamber and bearing at one end against said one end of said filter and bearing at the other end against said plate, and encircling said aperture, and comprising a bridging yoke member mounted to said plate within said collection chamber and extending across said aperture and cooperating with said valve in said aperture, said compression spring encircling said bridging yoke member.

4. The invention according to claim 3 wherein said bridging yoke member has a length greater than the diameter of said aperture, and has a width less than the diameter of said aperture, such that said collection chamber communicates with said valve through said aperture along the sides of said bridging yoke member.

5. The invention according to claim 4 wherein said valve includes a compression spring extending axially in said aperture and bearing at one end against said bridging yoke member, said first mentioned compression spring being concentric to said second mentioned compression spring.

6. The invention according to claim 5 wherein said bridging yoke member comprises distal ends on opposite sides of said aperture and mounted to said plate, a pair of grooves adjacent and inward of respective said last mentioned distal ends and generally aligned with the edges of said aperture, and a central boss between said grooves, said one end of said second compression spring being disposed in said grooves and encircling said boss, said boss extending axially within said second compression spring.

7. The invention according to claim 3 wherein said filter has a handle at said one end encircled by said compression spring and facing and axially spaced from said bridging yoke member, said plate being a removable member facing said handle, wherein said filter is readily changed by removing said plate, removing said compression spring, gripping said handle and extracting said filter axially from said second housing portion.

8. The invention according to claim 1 comprising a pressure responsive valve communicating radially with said collection chamber through a radial aperture in said one distal end of said housing unit, and wherein said housing unit is mounted to a truck or the like in a horizontal position such that said first and second housing portions extend generally horizontally, with said valve extending downwardly from the bottom of said second housing portion.

9. The invention according to claim, 8 comprising a second plate mounted to said one distal end of said housing unit and defining said radial aperture therethrough, and comprising a bridging yoke member mounted to said second plate within said collection chamber and extending across said aperture and cooperating with said valve in said aperture.

10. The invention according to claim 9 wherein said bridging yoke member has a length greater than the diameter of said aperture in said second plate, and has a width less than said diameter, said collection chamber communicating with said valve through said aperture along the sides of said bridging yoke member.

11. The invention according to claim 10 wherein said biasing comprises a compression spring extending axially in said collection chamber and bearing at one end against said one end of said filter and bearing at the other end against said first mentioned plate, and wherein said valve includes a compression spring in said aperture and bearing at one end against said bridging yoke member and extending generally perpendicularly to said first mentioned compression spring.

12. The invention according to claim 11 wherein said bridging yoke member has distal ends on opposite sides of said aperture and mounted to said second plate, a pai of grooves inwardly adjacent respective said last mentioned distal ends and generally aligned with the edges of said aperture, and a central boss between said grooves, said second spring being disposed in said grooves and encircling said boss.

* * * * *